(12) United States Patent
Komori

(10) Patent No.: US 10,938,491 B2
(45) Date of Patent: Mar. 2, 2021

(54) TRANSMISSION/RECEPTION CIRCUIT, COMMUNICATION APPARATUS, AND METHOD OF CONTROLLING TRANSMISSION/RECEPTION CIRCUIT

(71) Applicant: Sony Semiconductor Solutions Corporation, Kanagawa (JP)

(72) Inventor: Kenji Komori, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/758,575

(22) PCT Filed: Aug. 3, 2018

(86) PCT No.: PCT/JP2018/029254
§ 371 (c)(1),
(2) Date: Apr. 23, 2020

(87) PCT Pub. No.: WO2019/087501
PCT Pub. Date: May 9, 2019

(65) Prior Publication Data
US 2020/0351001 A1    Nov. 5, 2020

(30) Foreign Application Priority Data

Oct. 30, 2017   (JP) ............................. JP2017-209222

(51) Int. Cl.
*H04B 17/29* (2015.01)
(52) U.S. Cl.
CPC ................................... *H04B 17/29* (2015.01)

(58) Field of Classification Search
None
See application file for complete search history.

(56) References Cited

U.S. PATENT DOCUMENTS 5,933,767 A * 8/1999 Leizerovich ........... H03C 3/406
455/126
2006/0259836 A1* 11/2006 Liu .................... G01R 31/2822
714/724

(Continued)

FOREIGN PATENT DOCUMENTS

JP    06-120860 A    4/1994
JP    10-065746 A    3/1998

(Continued)

*Primary Examiner* — Hsinchun Liao
(74) *Attorney, Agent, or Firm* — Michael Best & Friedrich LLP

(57) ABSTRACT

A loop-back test is to be executed during wireless transmission in a circuit that performs wireless communication. A transmission circuit modulates a transmission information signal and supplies the transmission information signal, as a transmission signal, to an antenna. A loop-back test signal generation circuit modulates a predetermined signal to be modulated and supplies the predetermined signal to be modulated as a loop-back test signal. A selection unit selects one of a reception signal from the antenna or the loop-back test signal, and supplies the selected signal as a signal to be demodulated. A reception circuit demodulates the signal to be demodulated and acquires a reception information signal. A test circuit compares the reception information signal and the predetermined signal to be modulated.

9 Claims, 13 Drawing Sheets

(56) References Cited

U.S. PATENT DOCUMENTS

2012/0290888 A1    11/2012  Harvey
2014/0295775 A1*   10/2014  Rousu .................... H04L 5/001
                                                         455/73

FOREIGN PATENT DOCUMENTS

| JP | 2009-060174 A | 3/2009 |
| JP | 2009-218891 A | 9/2009 |
| JP | 2011-229042 A | 11/2011 |

* cited by examiner

FIG. 3
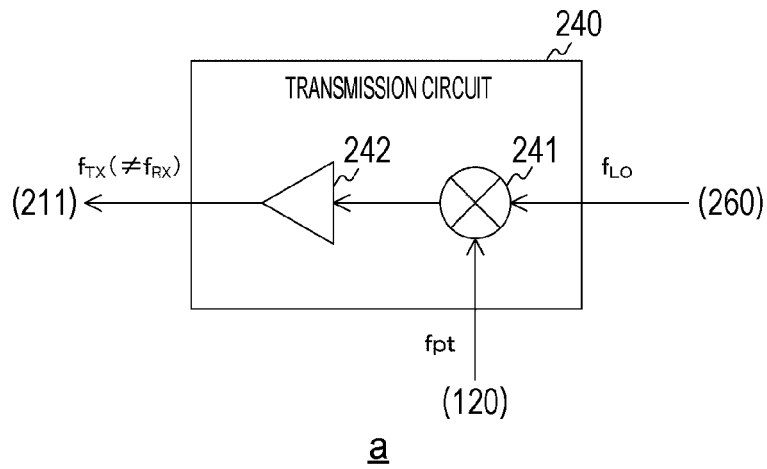
a
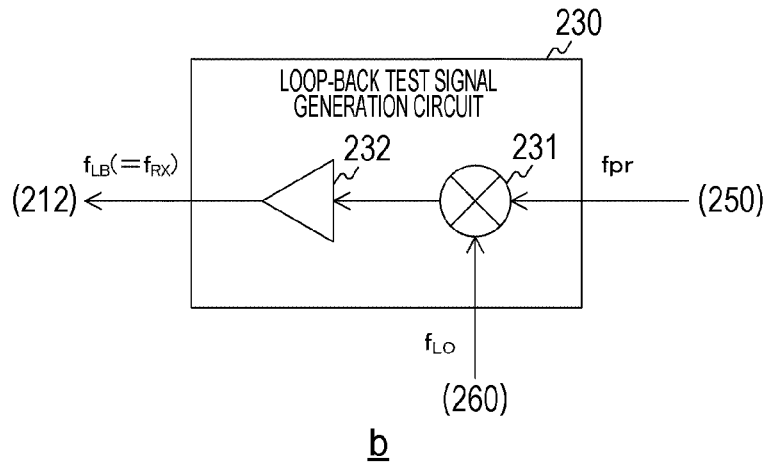
b
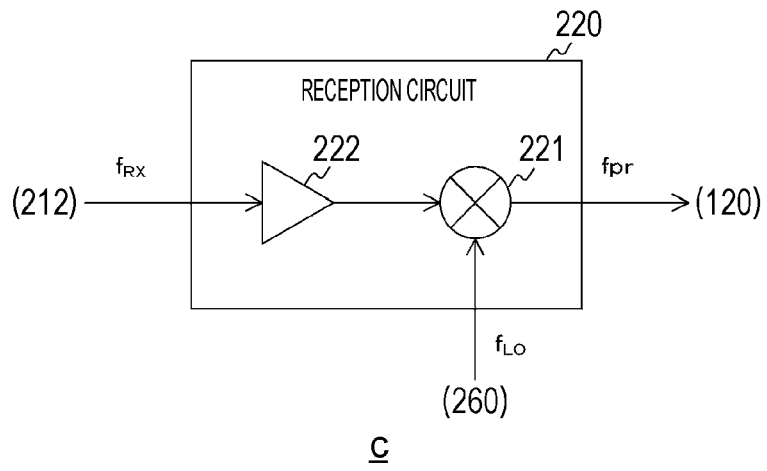
c

FIG. 8
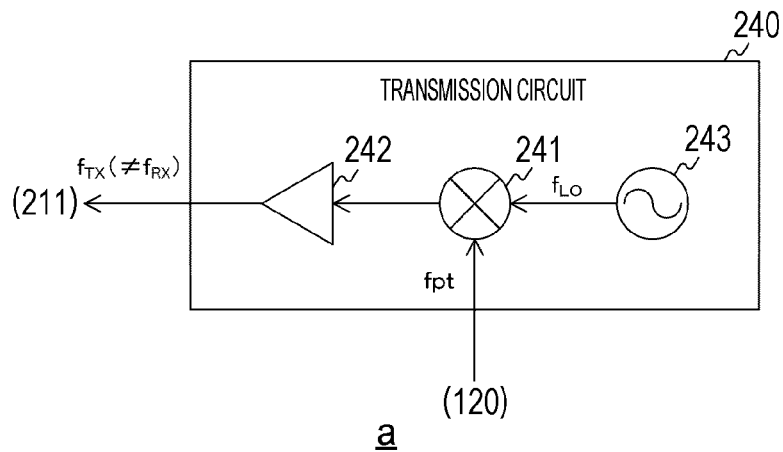
a
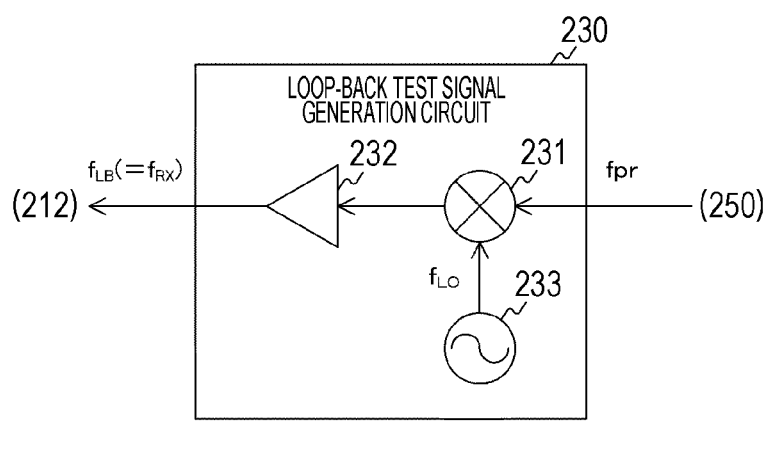
b
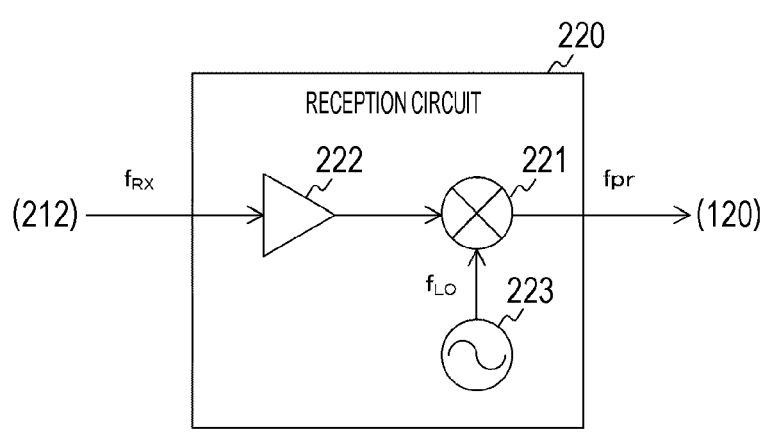
c

FIG. 10
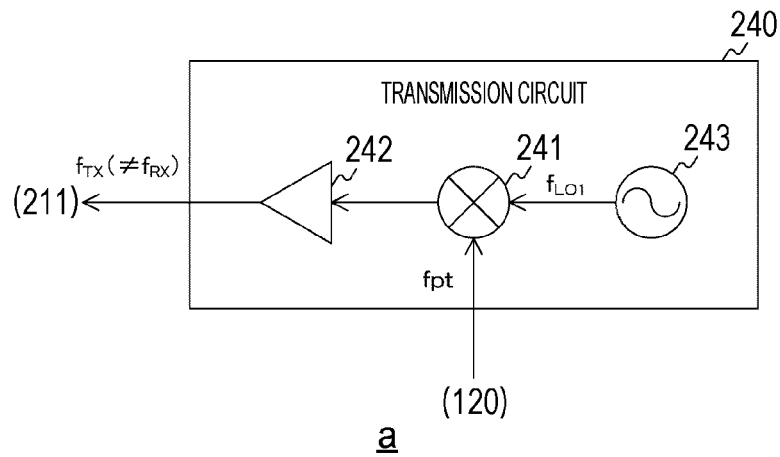
a
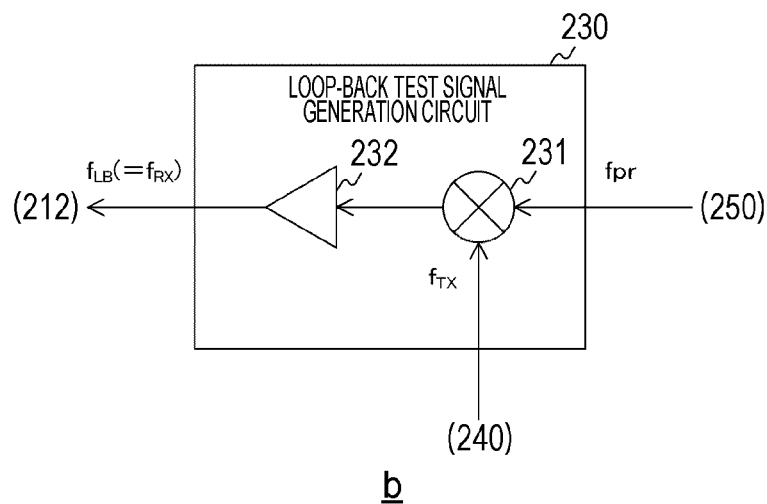
b
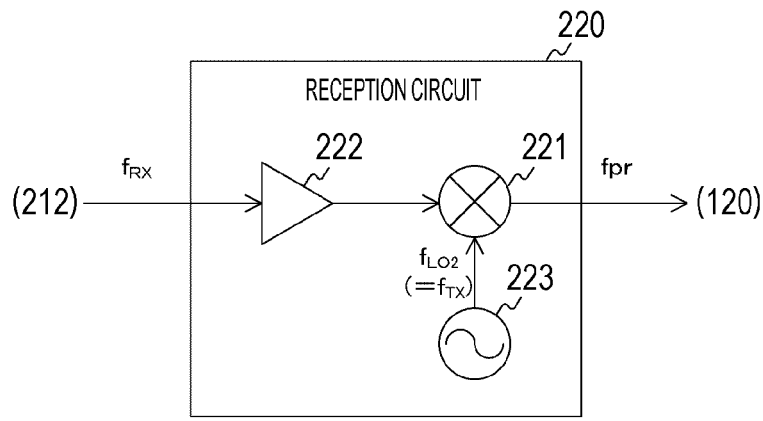
c

FIG. 12
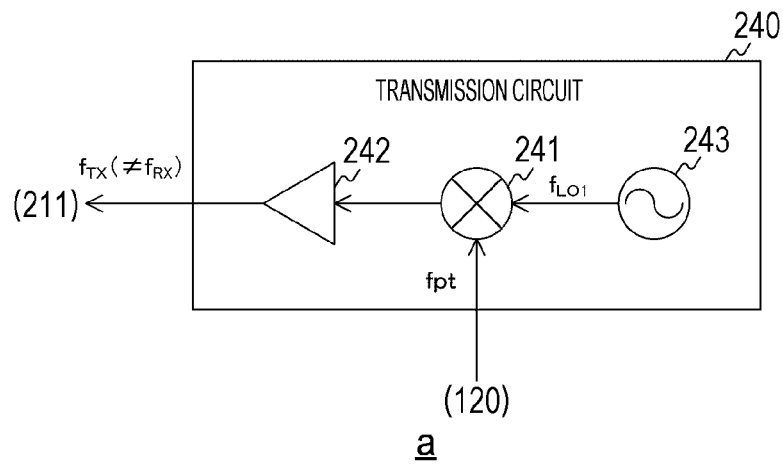
a
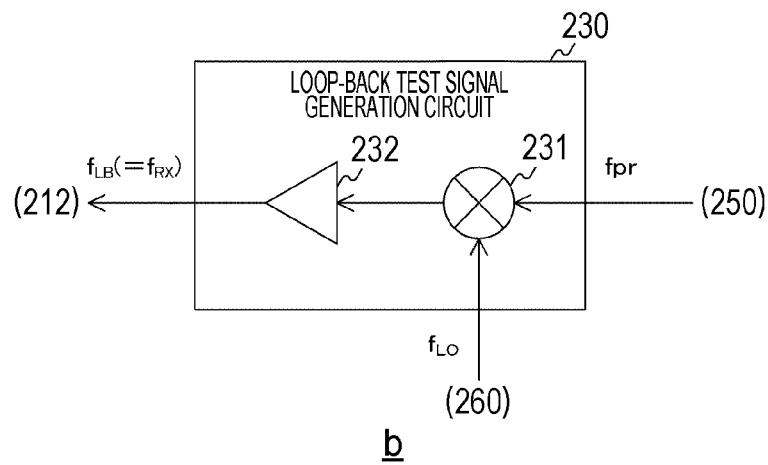
b
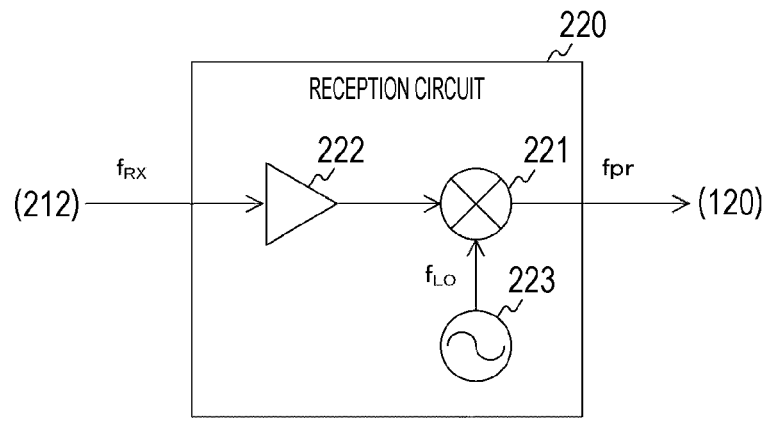
c

TRANSMISSION/RECEPTION CIRCUIT, COMMUNICATION APPARATUS, AND METHOD OF CONTROLLING TRANSMISSION/RECEPTION CIRCUIT

TECHNICAL FIELD

The present technology relates to a transmission/reception circuit, a communication apparatus, and a method of controlling the transmission/reception circuit. More specifically, the present technology relates to a transmission/reception circuit that performs carrier communication, a communication apparatus, and a method of controlling the transmission/reception circuit.

BACKGROUND ART

Conventionally, in wireless communication, carrier communication in which modulation and demodulation are performed by using a carrier wave such as a local signal is widely used. In addition, in a transmission/reception circuit that performs carrier communication, a loop-back test for transmitting a test signal to a reception circuit from a transmission circuit not via an antenna is performed in some cases, in order to determine whether or not the reception circuit normally operates. For example, there is proposed a circuit including a selector that separates the transmission circuit and the reception circuit from the antenna and directly connects the transmission circuit and the reception circuit at the time of the loop-back test (see, for example, Patent Document 1). In this circuit, the selector selects one of the transmission circuit or the reception circuit and connects the selected circuit to the antenna at the time of wireless communication. Further, in this circuit, the transmission circuit and the reception circuit share the same local oscillator.

CITATION LIST

Patent Document

Patent Document 1: Japanese Patent Application Laid-Open No. 2009-060174

SUMMARY OF THE INVENTION

Problems to be Solved by the Invention

In the related art described above, because the transmission circuit and the reception circuit share the local oscillator, a circuit scale and costs can be reduced, as compared to a case where those circuits individually include a local oscillator. However, in the related art described above, the transmission circuit and the reception circuit are not directly connected and are connected to the antenna at the time of wireless transmission. Thus, there is an issue that the loop-back test cannot be executed during wireless transmission.

The present technology has been made in view of such a circumstance, and an object thereof is to execute a loop-back test during wireless transmission in a circuit that performs wireless communication.

Solutions to Problems

The present technology is made in order to solve the above issue and a first aspect of the present technology is a transmission/reception circuit and a control method thereof including: a transmission circuit that modulates a transmission information signal and supplies the transmission information signal, as a transmission signal, to an antenna; a loop-back test signal generation circuit that modulates a predetermined signal to be modulated and supplies the predetermined signal to be modulated as a loop-back test signal; a selection unit that selects one of a reception signal from the antenna or the loop-back test signal, and supplies the selected signal as a signal to be demodulated; a reception circuit that demodulates the signal to be demodulated and acquires a reception information signal; and a test circuit that compares the reception information signal and the predetermined signal to be modulated.

With this configuration, while the transmission circuit can supply a transmission signal, a loop-back test signal can be generated.

In addition, in the first aspect includes a local oscillator that generates a predetermined local signal and supplies the predetermined local signal to the transmission circuit and the loop-back test signal generation circuit, in which the transmission circuit mixes the predetermined local signal and the transmission information signal, and the loop-back test signal generation circuit mixes the predetermined local signal and the predetermined signal to be modulated. With this configuration, the transmission circuit and the loop-back test signal generation circuit can share the local oscillator.

In addition, in the first aspect, the local oscillator may further transmit the predetermined local signal to the reception circuit, and the reception circuit may mix the predetermined local signal and the signal to be demodulated. With this configuration, the transmission circuit, the loop-back test signal generation circuit, and the reception circuit can share the local oscillator.

In addition, the first aspect may further include a phase shifter that corrects a phase error of the predetermined local signal and supplies the predetermined local signal to the reception circuit, and the local oscillator may supply the predetermined local signal to the reception circuit via the phase shifter. With this configuration, the phase error of the local signal can be corrected.

In addition, in the first aspect, the transmission circuit may include: a first local oscillator that generates a first local signal, and a first mixer that mixes the first local signal and the transmission information signal; and the reception circuit may include a second local oscillator that generates a second local signal, and a second mixer that mixes the second local signal and the signal to be demodulated. With this configuration, the phase error of the local signal can be restrained.

In addition, in the first aspect, the loop-back test signal generation circuit may include a third local oscillator that generates a third local signal, and a third mixer that mixes the third local signal and the predetermined signal to be modulated. With this configuration, the phase error of the local signal can be restrained.

In addition, in the first aspect, the transmission circuit may supply the transmission signal to the antenna and supply the transmission signal, as the predetermined signal to be modulated, to the loop-back test signal generation circuit. With this configuration, the local oscillator of the transmission circuit can be omitted.

In addition, a second aspect of the present technology is a communication apparatus including: a transmission circuit that modulates a transmission information signal and supplies the transmission information signal, as a transmission signal, to an antenna; the antenna that transmits the transmission signal and receives a reception signal; a loop-back test signal generation circuit that modulates a predetermined signal to be modulated and supplies the predetermined signal to be modulated as a loop-back test signal; a selection unit that selects one of the reception signal from the antenna or the loop-back test signal, and supplies the selected signal as a signal to be demodulated; a reception circuit that demodulates the signal to be demodulated and acquires a reception information signal; and a test circuit that compares the reception information signal and the predetermined signal to be modulated. With this configuration, while the transmission circuit can supply a transmission signal to the antenna, a loop-back test signal can be generated.

Effects of the Invention

The present technology has an excellent effect of executing a loop-back test during wireless transmission in a circuit that performs wireless communication. Note that the effect disclosed herein is not necessarily limited and may be any effect disclosed in the present disclosure.

BRIEF DESCRIPTION OF DRAWINGS

FIG. 3 is circuit diagrams showing configuration examples of a transmission circuit, a loop-back test signal generation circuit, and a reception circuit in the first embodiment of the present technology.

FIG. 8 is circuit diagrams showing configuration examples of a transmission circuit, a loop-back test signal generation circuit, and a reception circuit in the third embodiment of the present technology.

FIG. 10 is circuit diagrams showing configuration examples of a transmission circuit, a loop-back test signal generation circuit, and a reception circuit in the fourth embodiment of the present technology.

FIG. 12 is circuit diagrams showing configuration examples of a transmission circuit, a loop-back test signal generation circuit, and a reception circuit in the fifth embodiment of the present technology.

MODE FOR CARRYING OUT THE INVENTION

Hereinafter, modes for carrying out the present technology (hereinafter, referred to as "embodiments") will be described. Description will be made in the following order.

1. First embodiment (example where a loop-back test signal generation circuit generates a test signal)
2. Second embodiment (example where a phase error is corrected and a loop-back test signal generation circuit generates a test signal)
3. Third embodiment (example where a local oscillator is not shared, and a loop-back test signal generation circuit generates a test signal)
4. Fourth embodiment (example where a loop-back test signal generation circuit generates a test signal on the basis of a transmission signal)
5. Fifth embodiment (example where a loop-back test signal generation circuit that shares a local oscillator with a transmission circuit generates a test signal)
6. Application examples 1. First Embodiment

[Configuration Example of Communication Apparatus]

Figure 1:
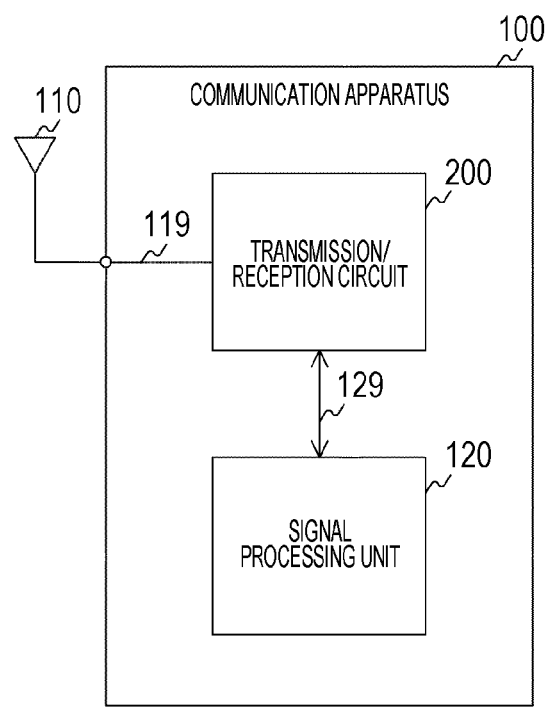
FIG. 1 is a block diagram showing a configuration example of a communication apparatus in a first embodiment of the present technology.

FIG. 1 is a block diagram showing a configuration example of a communication apparatus 100 in a first embodiment of the present technology. The communication apparatus 100 performs wireless communication and includes an antenna 110, a transmission/reception circuit 200, and a signal processing unit 120. The communication apparatus 100 is expected to be, for example, a smartphone or an IoT device.

The antenna 110 converts an electromagnetic wave into an electric signal and vice versa. The antenna 110 converts (i.e., receives) an electromagnetic wave into an electric signal and supplies the electric signal, as a reception signal, to the transmission/reception circuit 200 via a signal line 119. Further, the antenna 110 converts (i.e., transmits) a transmission signal that is an electric signal received from the transmission/reception circuit 200 via the signal line 119 into an electromagnetic wave.

The transmission/reception circuit 200 modulates and demodulates a signal. The transmission/reception circuit 200 modulates a transmission information signal that is an information signal received from the signal processing unit 120 via a signal line 129 and supplies the transmission information signal, as a transmission signal, to the antenna 110. Further, the transmission/reception circuit 200 demodulates a reception signal from the antenna 110, extracts an information signal as a reception information signal, and supplies the information signal to the signal processing unit 120 via the signal line 129.

The signal processing unit 120 performs predetermined signal processing on an information signal. The signal processing unit 120 performs signal processing such as coding to generate a transmission information signal and supplies the transmission information signal to the transmission/reception circuit 200. Further, the signal processing unit 120 receives a reception information signal from the transmission/reception circuit 200 and performs signal processing such as decoding on the signal. The information signals such as the transmission information signal and the reception information signal are, for example, pulse signals on which data is superimposed.

[Configuration Example of Transmission/Reception Circuit]

Figure 2:
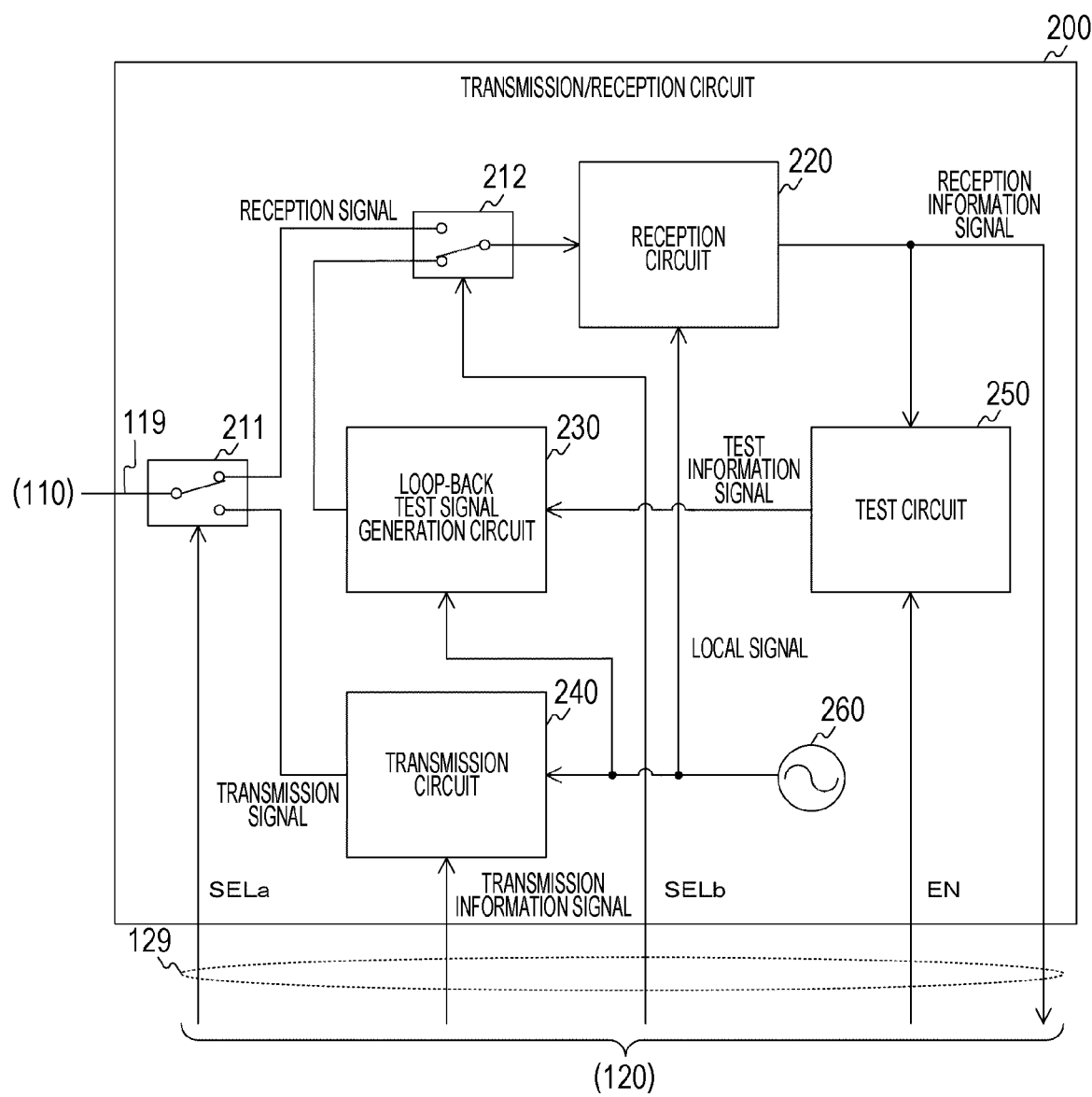
FIG. 2 is a block diagram showing a configuration example of a transmission/reception circuit in the first embodiment of the present technology.

FIG. 2 is a block diagram showing a configuration example of the transmission/reception circuit 200 in the first embodiment of the present technology. The transmission/reception circuit 200 includes selectors 211 and 212, a reception circuit 220, a loop-back test signal generation circuit 230, a transmission circuit 240, a test circuit 250, and a local oscillator 260.

The selector 211 selects one of the selector 212 or the transmission circuit 240, and connects the selected one to the antenna 110 in response to a selection signal SELa from the signal processing unit 120. The transmission/reception circuit 200 performs wireless communication while switching between transmission and reception by, for example, time-division. For a certain unit time allocated for transmission, the signal processing unit 120 controls the selector 211 so as to connect the transmission circuit 240 to the antenna 110 in response to the selection signal SELa. Thus, a transmission signal is output to the antenna 110 from the transmission circuit 240. This unit time is referred to as "time slot".

Further, for a unit time (i.e., time slot) allocated for reception, the signal processing unit 120 controls the selector 211 so as to connect the selector 212 to the antenna 110 in response to the selection signal SELa. Thus, a reception signal is output to the selector 212 from the antenna 110.

The transmission circuit 240 modulates a transmission information signal from the signal processing unit 120 and supplies the transmission information signal as a transmission signal. The transmission circuit 240 mixes a local signal from the local oscillator 260 and the transmission information signal, thereby generating a transmission signal. With this mixture, the transmission information signal is superimposed (i.e., modulated) on the local signal. Then, the transmission circuit 240 supplies the generated transmission signal to the antenna 110 via the selector 211.

The loop-back test signal generation circuit 230 modulates a predetermined test information signal from the test circuit 250 and supplies the predetermined test information signal as a loop-back test signal. The loop-back test signal generation circuit 230 mixes the local signal from the local oscillator 260 and the test information signal, thereby generating a loop-back test signal. With this mixture, the test information signal is superimposed (i.e., modulated) on the local signal. Then, the loop-back test signal generation circuit 230 supplies the generated loop-back test signal to the selector 212.

The selector 212 selects one of the reception signal or the loop-back test signal in response to a selection signal SELb and supplies the selected signal, as a signal to be demodulated, to the reception circuit 220. In a time slot allocated for a loop-back test, the signal processing unit 120 controls the selector 212 so as to supply the loop-back test signal, as the signal to be demodulated, to the reception circuit 220 in response to the selection signal SELb. Herein, the loop-back test and transmission can be allocated in the same time slot.

Further, in a time slot not allocated for the loop-back test, the signal processing unit 120 controls the selector 212 so as to supply the reception signal, as the signal to be demodulated, to the reception circuit 220 in response to the selection signal SELb. Note that the selector 212 is an example of a selection unit recited in CLAIMS.

The reception circuit 220 demodulates the signal to be demodulated from the selector 212 and acquires a reception information signal. The reception circuit 220 mixes the local signal from the local oscillator 260 and the signal to be demodulated. With this mixture, the reception information signal is extracted from the signal to be demodulated. In other words, the signal to be demodulated is demodulated. Then, the reception circuit 220 supplies the acquired reception information signal to the test circuit 250 and the signal processing unit 120.

The local oscillator 260 generates a local signal having a predetermined frequency. The local oscillator 260 supplies the generated local signal to the reception circuit 220, the loop-back test signal generation circuit 230, and the transmission circuit 240. As described above, the loop-back test signal generation circuit 230 and the transmission circuit 240 share the same local oscillator 260. Because the local oscillator 260 is shared, a circuit scale and a chip cost can be reduced, as compared to a configuration in which the loop-back test signal generation circuit 230 and the transmission circuit 240 individually include a local oscillator.

The test circuit 250 compares the test information signal and the reception information signal in response to an enable signal EN from the signal processing unit 120. The enable signal EN is a signal for operating or stopping the test circuit 250. In the time slot allocated for the loop-back test, the signal processing unit 120 enables the enable signal EN to operate the test circuit 250. Meanwhile, in the time slot not allocated for the loop-back test, the signal processing unit 120 disables the enable signal EN to stop the test circuit 250.

In a case where the enable signal EN is enabled, the test circuit 250 generates a test information signal and supplies the test information signal to the loop-back test signal generation circuit 230. Then, the test circuit 250 receives a reception information signal from the reception circuit 220, compares the reception information signal with the test information signal, and determines whether or not the reception circuit 220 normally operates. The test performed by supplying a signal generated in the circuit to the reception circuit 220 not via the antenna 110 as described above is referred to as "loop-back test". By the loop-back test, the reception circuit 220 can be tested without using a signal from the outside. Consequently, costs and adjustment time required for the test of the reception circuit 220 can be reduced.

Note that the transmission/reception circuit 200 performs the loop-back test during transmission, but is not limited to this configuration. For example, the transmission/reception circuit 200 may perform the loop-back test in a period of time other than the time slot for transmission.

Further, the signal processing unit 120 controls the test circuit 250 in response to the enable signal EN, but may further individually control the loop-back test signal generation circuit 230 and the transmission circuit 240 in response to the enable signal. In this case, the signal processing unit 120 stops the transmission circuit 240 in a period of time other than the time slot for transmission in response to the enable signal, and stops the reception circuit 220 in a period of time other than the time slot for reception in response to the enable signal. Further, the signal processing unit 120 stops the loop-back test signal generation circuit 230 in a period of time other than the time slot for the loop-back test in response to the enable signal. For example, a power saving mode and a normal mode are set, and, in the normal mode, the transmission/reception circuit 200 may perform the loop-back test during transmission. Meanwhile, in the power saving mode, the transmission/reception circuit 200 performs the loop-back test in a period of time other than the time slot for transmission, and stops the transmission circuit 240 during the loop-back test. Thus, power consumption can be less in the power saving mode than in the normal mode.

[Configuration Examples of Transmission Circuit, Loop-Back Test Signal Generation Circuit, and Reception Circuit]

FIG. 3 is circuit diagrams showing configuration examples of the transmission circuit 240, the loop-back test signal generation circuit 230, and the reception circuit 220 in the first embodiment of the present technology. A part "a" of FIG. 3 is a circuit diagram showing a configuration example of the transmission circuit 240, and a part "b" of FIG. 3 is a circuit diagram showing a configuration example of the loop-back test signal generation circuit 230. Further, a part "c" of FIG. 3 is a circuit diagram showing a configuration example of the reception circuit 220.

The transmission circuit 240 includes a mixer 241 and a low-noise amplifier 242. The mixer 241 mixes the local signal from the local oscillator 260 and the transmission information signal from the signal processing unit 120, thereby generating a transmission signal, and supplies the transmission signal to the low-noise amplifier 242. The low-noise amplifier 242 amplifies the transmission signal and supplies the transmission signal to the selector 211. When a local frequency of the local signal is denoted by $f_{LO}$ and a frequency of the transmission information signal is denoted by $f_{pr}$, a transmission signal having a transmission frequency $f_{TX}$ that is different from the above frequencies can be obtained because of the mixture of the local signal. The transmission frequency $f_{TX}$ is different from, for example, a reception frequency $f_{RX}$ of the reception signal.

Further, the loop-back test signal generation circuit 230 includes a mixer 231 and a low-noise amplifier 232. The mixer 231 mixes the local signal from the local oscillator 260 and the test information signal from the test circuit 250, thereby generating a loop-back test signal, and supplies the loop-back test signal to the low-noise amplifier 232. The low-noise amplifier 232 amplifies the loop-back test signal and supplies the loop-back test signal to the selector 212. When a frequency of the test information signal is denoted by $f_{pt}$, the loop-back test signal having a frequency $f_{LB}$ that is the same as the reception frequency $f_{RX}$ can be obtained because of the mixture of the local signal. The frequency $f_{pt}$ is different from, for example, the frequency $f_{pt}$ of the transmission information signal. Therefore, the frequency $f_{LB}$ has a different value from that of the transmission frequency $f_{TX}$. Further, the frequency $f_{LB}$ has the same value as that of the reception frequency $f_{RX}$.

Further, the reception circuit 220 includes a mixer 221 and a low-noise amplifier 222. The low-noise amplifier 222 amplifies the signal to be demodulated from the selector 212 and supplies the signal to be demodulated to the signal processing unit 120. The mixer 221 mixes the local signal from the local oscillator 260 and the amplified signal to be demodulated, thereby generating a reception information signal, and supplies the reception information signal to the low-noise amplifier 222. The reception information signal having the frequency $f_{pr}$ can be obtained because of the mixture of the local signal.

[Operation Example of Transmission/Reception Circuit]

Figure 4:
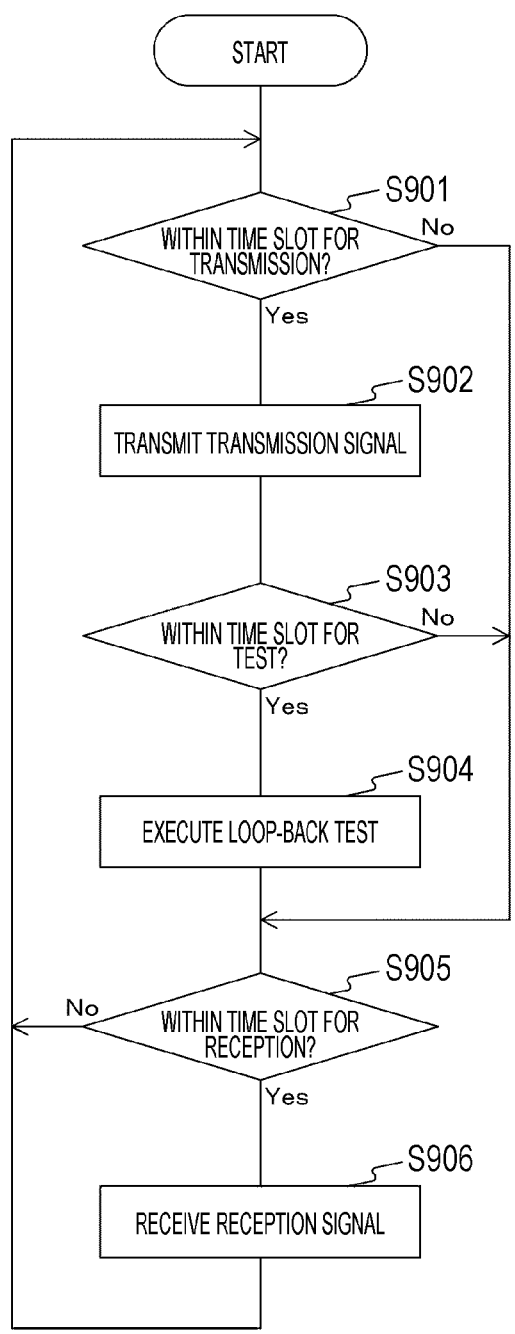
FIG. 4 is a flowchart showing an example of operation of a transmission/reception circuit in the first embodiment of the present technology.

FIG. 4 is a flowchart showing an example of operation of the transmission/reception circuit 200 in the first embodiment of the present technology. This operation is started when, for example, a predetermined application for performing wireless communication is executed.

The transmission/reception circuit 200 determines whether or not a current time is within the time slot for transmission (step S901). In a case where the current time is within the time slot for transmission (step S901: Yes), the transmission/reception circuit 200 transmits a transmission signal (step S902).

Further, during transmission, the transmission/reception circuit 200 determines whether or not a current time is within the time slot for the loop-back test (step S903). The loop-back test and transmission can be allocated in the same time slot as described above. In a case where the current time is within the time slot for the loop-back test (step S903: Yes), the transmission/reception circuit 200 selects a loop-back test signal, demodulates the loop-back test signal in the reception circuit 220, and executes the loop-back test (step S904).

In a case where the current time is not within the time slot for the loop-back test (step S903: No) or after step S904, the transmission/reception circuit 200 determines whether or not a current time is within the time slot for reception (step S905). Further, also in a case where the current time is not within the time slot for transmission (step S901: No), step S905 is executed. In a case where the current time is within the time slot for reception (step S905: Yes), the transmission/reception circuit 200 receives a reception signal (step S906). Meanwhile, in a case where the current time is not within the time slot for reception (step S905: No), the transmission/reception circuit 200 repeatedly executes step S901 and the subsequent steps.

As described above, according to the first embodiment of the present technology, the transmission circuit 240 supplies a transmission signal, and the loop-back test signal generation circuit 230 generates a loop-back test signal. Thus, it is possible to perform the loop-back test during transmission.

2. Second Embodiment

In the first embodiment described above, the transmission circuit 240 and the loop-back test signal generation circuit 230 share the local oscillator 260. However, in this configuration, a phase error may occur in the local signal transmitted not via the loop-back test signal generation circuit 230, with respect to a phase of the loop-back test signal that is a signal transmitted via the circuit. Consequently, verification accuracy of the loop-back test may be reduced. The transmission/reception circuit 200 in a second embodiment is different from that in the first embodiment in that the phase error of the local signal is corrected.

Figure 5:
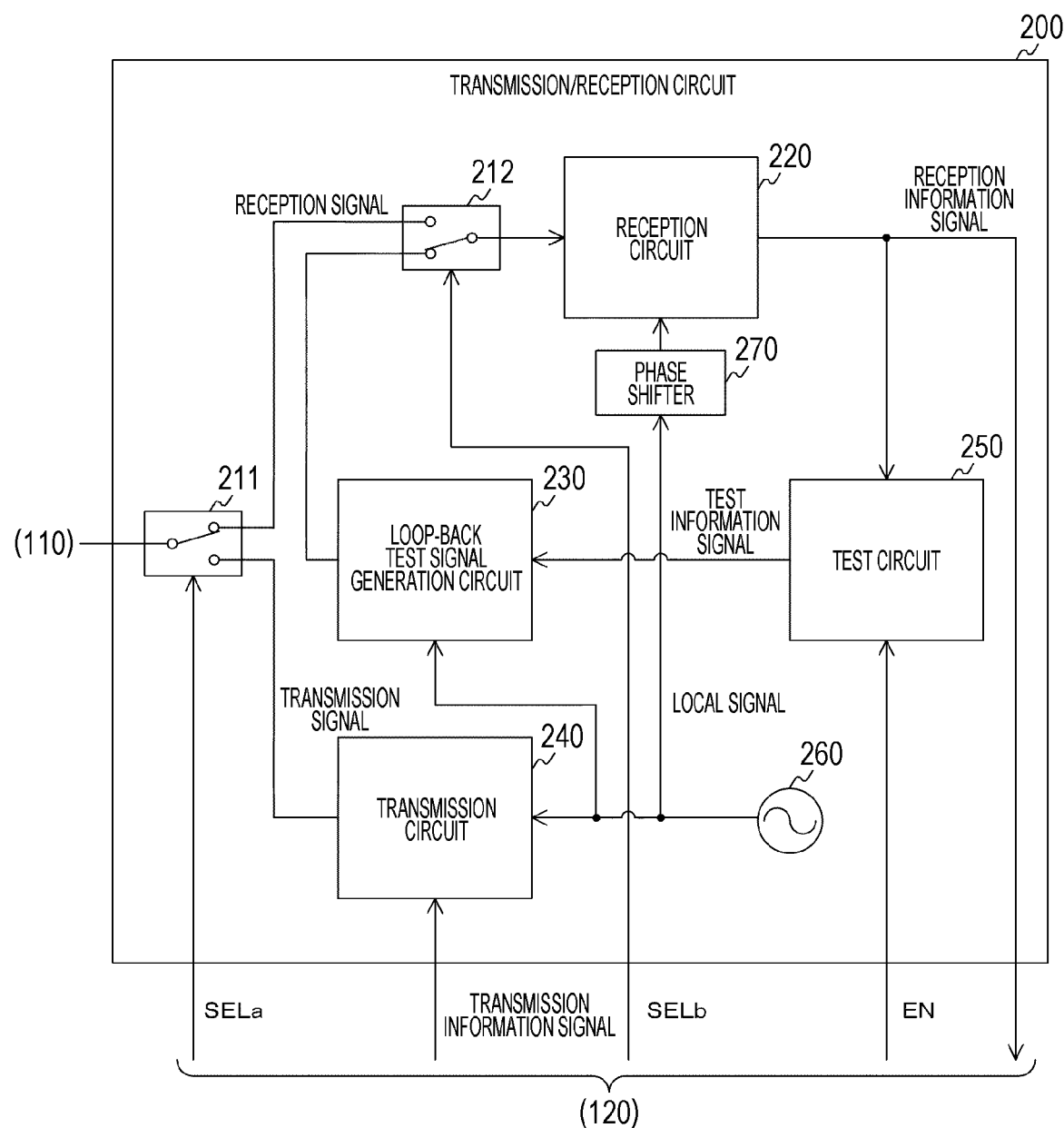
FIG. 5 is a block diagram showing a configuration example of a transmission/reception circuit in the second embodiment of the present technology.

FIG. 5 is a block diagram showing a configuration example of the transmission/reception circuit 200 in the second embodiment of the present technology. The transmission/reception circuit 200 in the second embodiment is different from that in the first embodiment in that a phase shifter 270 is further provided.

The phase shifter 270 corrects a phase error of a local signal from the local oscillator 260 with respect to a phase of a loop-back test signal. The phase shifter 270 supplies the corrected local signal to the reception circuit 220.

Figure 6:
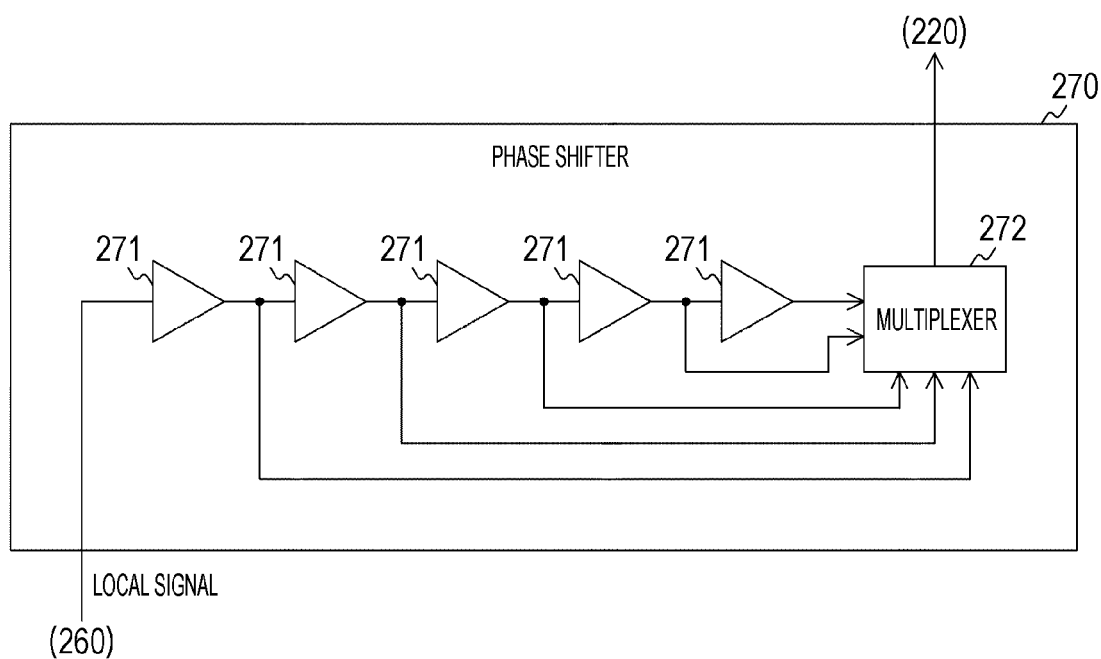
FIG. 6 is a circuit diagram showing a configuration example of a phase shifter in a second embodiment of the present technology.

FIG. 6 is a circuit diagram showing a configuration example of the phase shifter 270 in the second embodiment of the present technology. The phase shifter 270 includes a predetermined number of (e.g., five) delay circuits 271 and a multiplexer 272.

The delay circuit 271 delays an input signal and outputs the input signal. The local signal from the local oscillator 260 is input to an input terminal of the first delay circuit 271. Further, an output terminal of the first delay circuit is connected to an input terminal of the second delay circuit 271 and the multiplexer 272. Note that the number of the delay circuits 271 is not limited to five.

An output terminal of the second delay circuit is connected to an input terminal of the third delay circuit 271 and the multiplexer 272. An output terminal of the third delay circuit is connected to an input terminal of the fourth delay circuit 271 and the multiplexer 272. An output terminal of the fourth delay circuit is connected to an input terminal of the fifth delay circuit 271 and the multiplexer 272. An output terminal of the fifth delay circuit is connected to the multiplexer 272.

The multiplexer 272 selects one of the signals of the respective delay circuits 271 and supplies the selected signal to the reception circuit 220. The signal to be selected is set by a register or the like in advance before communication.

As described above, according to the second embodiment of the present technology, the phase shifter 270 corrects the phase error of the local signal. Accordingly, verification accuracy of the loop-back test can be improved.

3. Third Embodiment

In the first embodiment described above, the transmission circuit 240 and the loop-back test signal generation circuit 230 share the local oscillator 260. However, in this configuration, a phase error may occur in the local signal transmitted not via the loop-back test signal generation circuit 230, with respect to a phase of the loop-back test signal that is a signal transmitted via the circuit. Consequently, verification accuracy of the loop-back test may be reduced. The transmission/reception circuit 200 in the third embodiment is different from that in the first embodiment in that the transmission circuit 240 and the loop-back test signal generation circuit 230 individually include a local oscillator.

Figure 7:
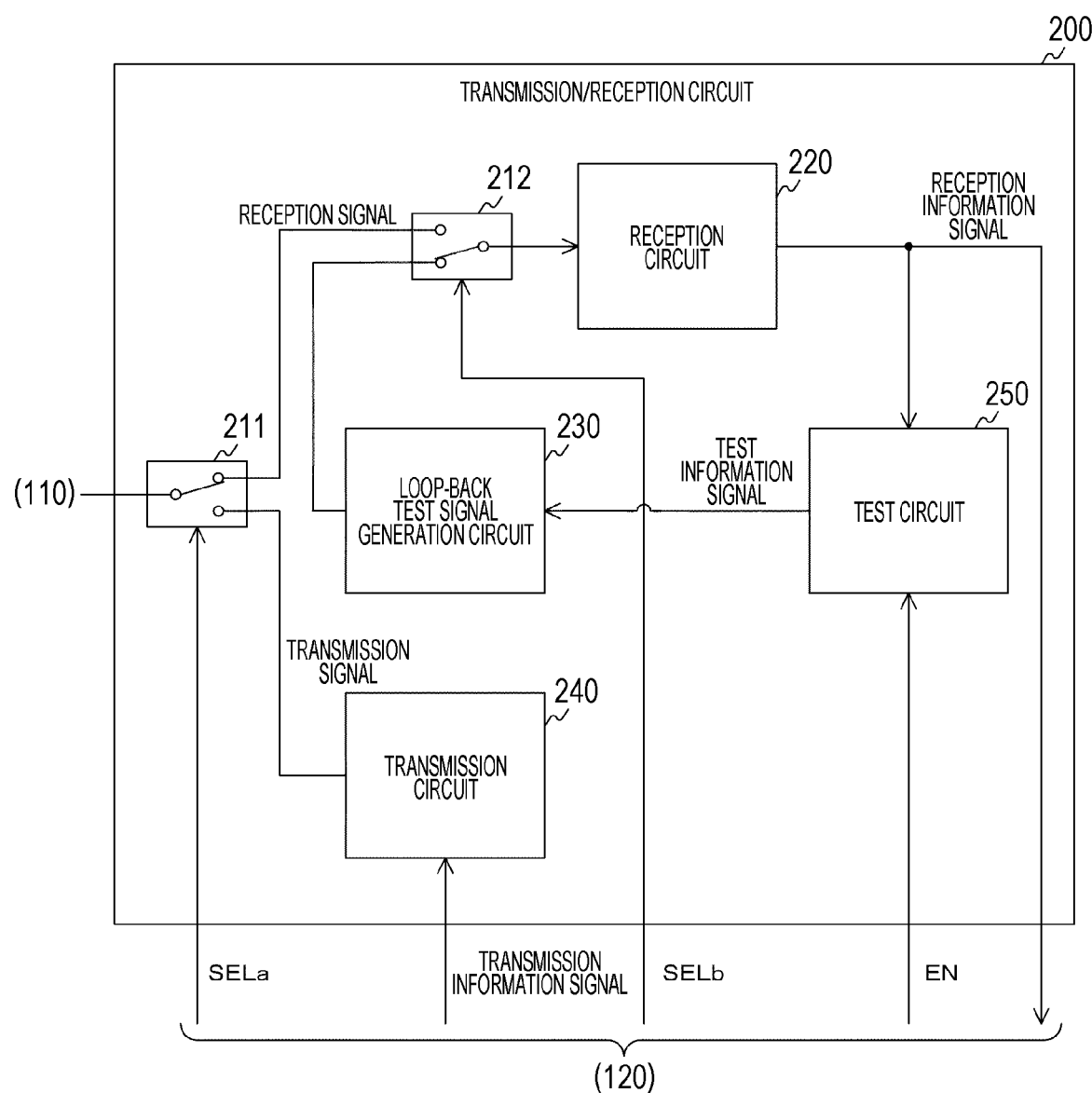
FIG. 7 is a block diagram showing a configuration example of a transmission/reception circuit in a third embodiment of the present technology.

FIG. 7 is a block diagram showing a configuration example of the transmission/reception circuit 200 in the third embodiment of the present technology. The transmission/reception circuit 200 in the third embodiment is different from that in the first embodiment in that the local oscillator 260 is not provided.

FIG. 8 is circuit diagrams showing configuration examples of the transmission circuit 240, the loop-back test signal generation circuit 230, and the reception circuit 220 in the third embodiment of the present technology. A part "a" of FIG. 3 is a circuit diagram showing a configuration example of the transmission circuit 240, and a part "b" of FIG. 3 is a circuit diagram showing a configuration example of the loop-back test signal generation circuit 230. Further, a part "c" of FIG. 3 is a circuit diagram showing a configuration example of the reception circuit 220.

The transmission circuit 240 in the third embodiment is different from that in the first embodiment in that a local oscillator 243 is further provided. The local oscillator 243 supplies a local signal to the mixer 241. Note that the local oscillator 243 is an example of a first local oscillator recited in CLAIMS, and the mixer 241 is an example of a first mixer recited in CLAIMS.

The loop-back test signal generation circuit 230 in the third embodiment is different from that in the first embodiment in that a local oscillator 233 is further provided. The local oscillator 233 supplies a local signal to the mixer 231. Note that the local oscillator 233 is an example of a third local oscillator recited in CLAIMS, and the mixer 231 is an example of a third mixer recited in CLAIMS.

The reception circuit 220 in the third embodiment is different from that in the first embodiment in that a local oscillator 223 is further provided. The local oscillator 223 supplies a local signal to the mixer 221. Note that the local oscillator 223 is an example of a second local oscillator recited in CLAIMS, and the mixer 221 is an example of a second mixer recited in CLAIMS.

Further, the local signals generated by the respective local oscillators 223, 233, and 243 have the same frequency and phase.

As described above, according to the second embodiment of the present technology, the local oscillators having the same phase are provided in the transmission circuit 240 and the loop-back test signal generation circuit 230, respectively. With this arrangement, the phase error of the local signal can be restrained.

4. Fourth Embodiment

In the third embodiment described above, the local oscillators are individually arranged in the transmission circuit 240, the loop-back test signal generation circuit 230, and the reception circuit 220, respectively. However, this arrangement increases a circuit scale and costs, as compared to a configuration in which those circuits share a local oscillator. The transmission/reception circuit 200 in a fourth embodiment is different from that in the third embodiment in that the loop-back test signal generation circuit 230 generates a loop-back test signal by using a transmission signal instead of a local signal.

Figure 9:
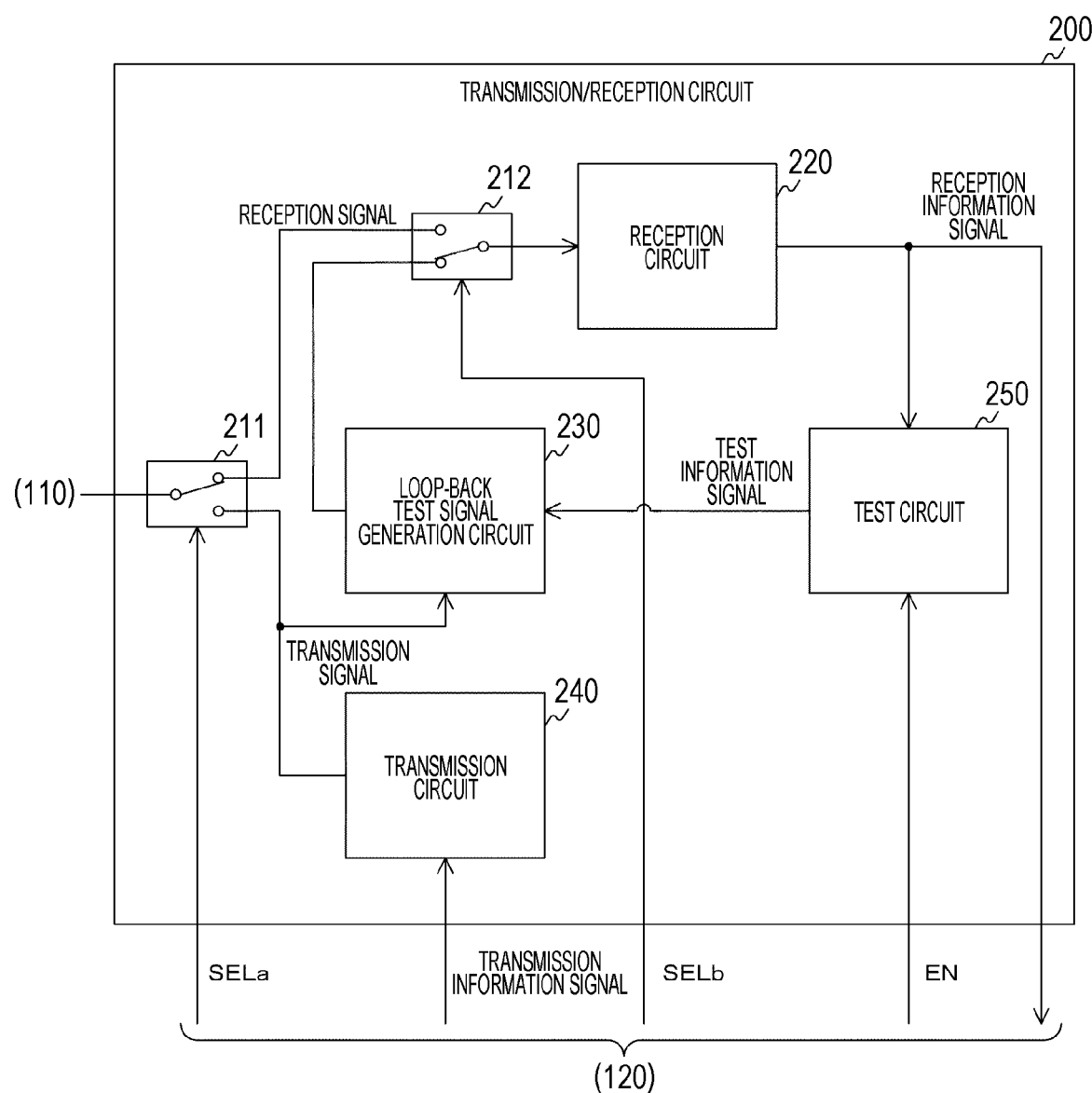
FIG. 9 is a block diagram showing a configuration example of a transmission/reception circuit in a fourth embodiment of the present technology.

FIG. 9 is a block diagram showing a configuration example of the transmission/reception circuit 200 in the fourth embodiment of the present technology. The transmission/reception circuit 200 in the fourth embodiment is different from that in the third embodiment in that the loop-back test signal generation circuit 230 generates a loop-back test signal by using a reception signal.

FIG. 10 is circuit diagrams showing configuration examples of the transmission circuit 240, the loop-back test signal generation circuit 230, and the reception circuit 220 in the fourth embodiment of the present technology. A part "a" of FIG. 3 is a circuit diagram showing a configuration example of the transmission circuit 240, and a part "b" of FIG. 3 is a circuit diagram showing a configuration example of the loop-back test signal generation circuit 230. Further, a part "c" of FIG. 3 is a circuit diagram showing a configuration example of the reception circuit 220.

In the transmission circuit 240, the local oscillator 243 generates a local signal having a local frequency $f_{LO1}$.

Further, the local oscillator 233 is not arranged in the loop-back test signal generation circuit 230. In the loop-back test signal generation circuit 230, the mixer 231 mixes a transmission signal having the transmission frequency $f_{TX}$ and a test information signal having the frequency $f_{pr}$, thereby generating a local loop-back signal.

Further, in the reception circuit 220, the local oscillator 223 generates a local signal having a frequency $f_{LO2}$ that is the same as the transmission frequency $f_{TX}$ and supplies the local signal to the mixer 221.

As described above, according to the fourth embodiment of the present technology, the loop-back test signal generation circuit 230 generates a loop-back test signal by using a transmission signal instead of a local signal. Therefore, the local oscillator in the loop-back test signal generation circuit 230 can be omitted.

5. Fifth Embodiment

In the fourth embodiment described above, the loop-back test signal generation circuit 230 generates a loop-back test signal by using a transmission signal. However, the transmission circuit 240 cannot be stopped during the loop-back test, which makes it difficult to reduce power consumption. The transmission/reception circuit 200 in a fifth embodiment is different from that in the fourth embodiment in that the transmission circuit 240 and the loop-back test signal generation circuit 230 share the local oscillator 260.

Figure 11:
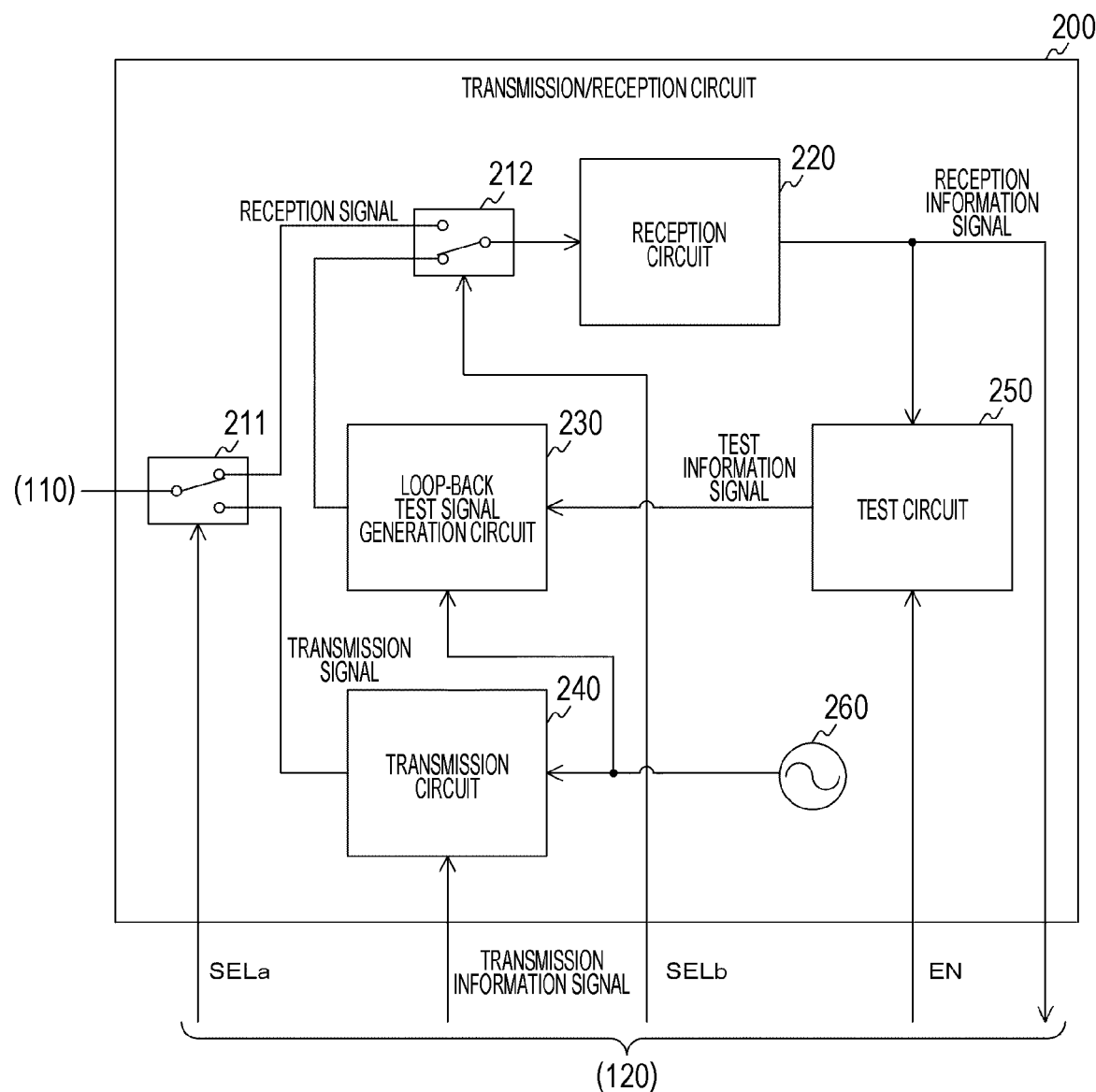
FIG. 11 is a block diagram showing a configuration example of a transmission/reception circuit in a fifth embodiment of the present technology.

FIG. 11 is a block diagram showing a configuration example of the transmission/reception circuit 200 in the fifth embodiment of the present technology. The transmission/reception circuit 200 in the fifth embodiment is different from that in the fourth embodiment in that the local oscillator 260 is further provided. The local oscillator 260 supplies a local signal to the transmission circuit 240 and the loop-back test signal generation circuit 230. The transmission circuit 240 modulates a transmission information signal by using the local signal, and the loop-back test signal generation circuit 230 modulates a test information signal by using the local signal.

FIG. 12 is circuit diagrams showing configuration examples of the transmission circuit 240, the loop-back test signal generation circuit 230, and the reception circuit 220 in the fifth embodiment of the present technology. A part "a" of FIG. 3 is a circuit diagram showing a configuration example of the transmission circuit 240, and a part "b" of FIG. 3 is a circuit diagram showing a configuration example of the loop-back test signal generation circuit 230. Further, a part "c" of FIG. 3 is a circuit diagram showing a configuration example of the reception circuit 220.

A configuration of the transmission circuit 240 in the fifth embodiment is similar to that in the fourth embodiment. A configuration of the loop-back test signal generation circuit 230 in the fifth embodiment is similar to that in the fourth embodiment, except that a local signal is modulated instead of a transmission signal. A configuration of the reception circuit 220 in the fifth embodiment is similar to that in the fourth embodiment. Note that a phase and frequency of a local signal generated by the local oscillator 223 is similar to those of the local signal generated by the local oscillator 260.

As described above, according to the fifth embodiment of the present technology, while the transmission circuit 240 modulates a transmission information signal, the loop-back test signal generation circuit 230 modulates a test information signal. Therefore, power consumption can be reduced by stopping the transmission circuit 240 during the loop-back test.

6. Application Example

A technology according to the present disclosure is applicable to a technology that is so-called Internet of things (IoT). IoT is a mechanism in which an IoT device 9100 that is a "thing" is connected to another IoT device 9003, the Internet, a cloud 9005, and the like and exchanges information to control each other. IoT can be used in various industries such as agriculture, houses, automobiles, manufacture, distribution, and energy.

Figure 13:
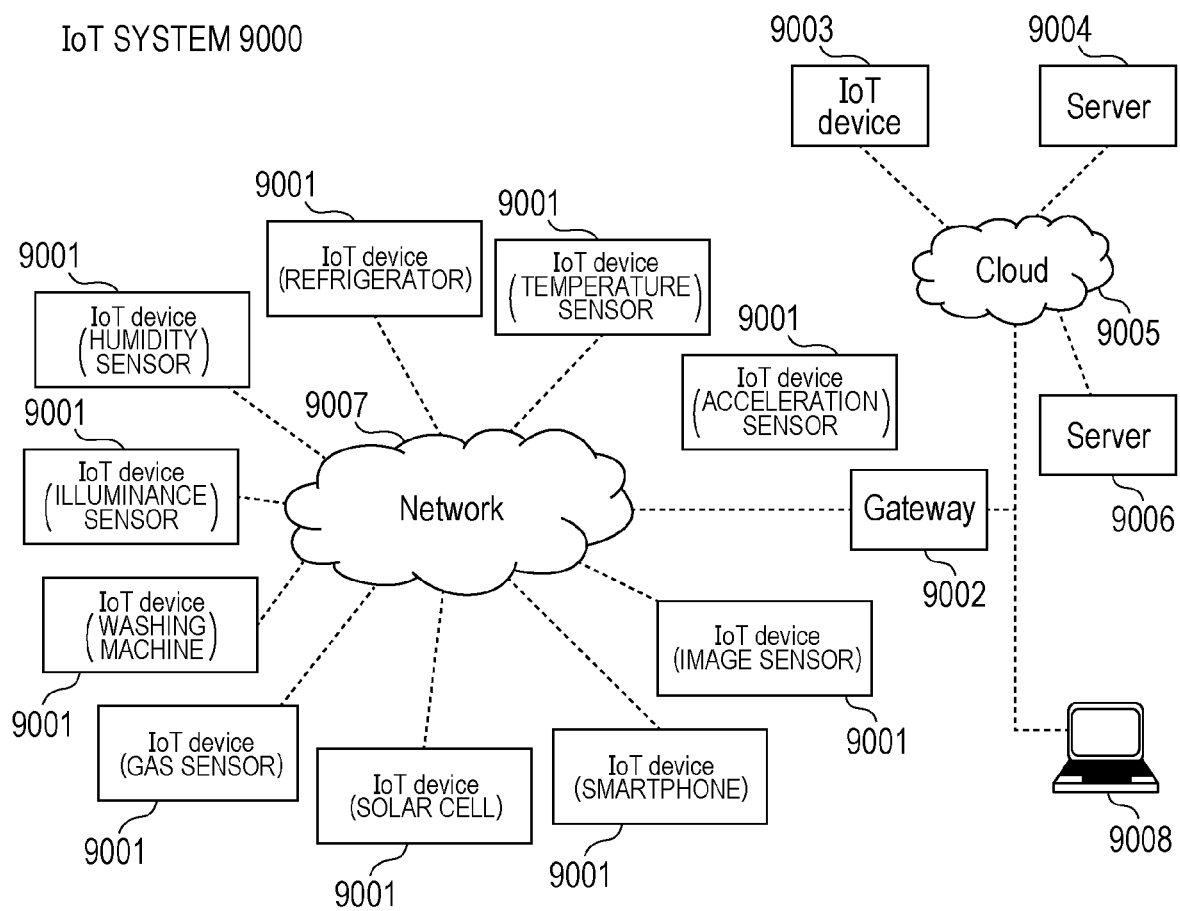
FIG. 13 shows an example of a schematic configuration of an Internet of Things (IoT) system to which a technology according to the present disclosure is applicable.

FIG. 13 is a diagram showing an example of a schematic configuration of an IoT system 9000 to which the technology according to the present disclosure is applicable.

An IoT device 9001 encompasses various kinds of sensors such as a temperature sensor, a humidity sensor, an illuminance sensor, an acceleration sensor, a distance sensor, an image sensor, a gas sensor, and a motion sensor. Further, the IoT device 9001 may encompass terminals such as a smartphone, a mobile phone, a wearable terminal, and a game console. Power is supplied to the IoT device 9001 from an AC power supply, a DC power supply, a battery, non-contact power supply, so-called energy harvesting, or the like. The IoT device 9001 can perform communication via wired, wireless, proximity wireless communication, or the like. As a communication method, 3G/LTE, WiFi, IEEE802.15.4, Bluetooth, Zigbee (registered trademark), Z-Wave, or the like is suitably used. The IoT device 9001 may switch those plurality of communication means to perform communication.

The IoT device 9001 may form a peer-to-peer, star, tree, or meshed network. The IoT device 9001 may be connected to the external cloud 9005 directly or via a gateway 9002. An address is given to the IoT device 9001 by using IPv4, IPv6, 6LoWPAN, or the like. Data collected from the IoT device 9001 is transmitted to another IoT device 9003, a server 9004, the cloud 9005, or the like. A timing at which or a frequency with which data is transmitted from the IoT device 9001 may be suitably adjusted, and data may be compressed and transmitted. Such data may be used as it is, or data may be analyzed by a computer 9008 with the use of various means such as statistical analysis, machine learning, data mining, cluster analysis, discriminant analysis, combination analysis, and time series analysis. By using such data, it is possible to provide various services such as control, warning, monitoring, visualization, automation, and optimization.

The technology according to the present disclosure are also applicable to devices and services regarding a house. The IoT device 9001 in a house encompasses a washing machine, a drying machine, a dryer, a microwave oven, a dishwasher, a refrigerator, an oven, a rice cooker, a cooking tool, a gas appliance, a fire alarm, a thermostat, an air conditioner, a television, a recorder, audio equipment, lighting equipment, a water heater, a hot water dispenser, a vacuum cleaner, a fan, an air cleaner, a security camera, a lock, a door/shutter opening and closing apparatus, a sprinkler, a toilet, a thermometer, a weighing scale, a sphygmomanometer, and the like. The IoT device 9001 may further encompass a solar cell, a fuel cell, a storage battery, a gas meter, an electricity meter, and a distribution board.

A communication method of the IoT device 9001 in a house is desirably a low-power-consumption communication method. Further, the IoT device 9001 may perform communication via WiFi inside the house and via 3G/LTE outside the house. An external server 9006 for controlling the IoT device may be installed in the cloud 9005 to control the IoT device 9001. The IoT device 9001 transmits data such as a situation of a home appliance, temperature, humidity, energy consumption, and presence/absence of a person/animal inside/outside the house. Data transmitted from the home appliances is accumulated in the external server 9006 via the cloud 9005. A new service is provided on the basis of such data. Such an IoT device 9001 can be controlled by audio with the use of an audio recognition technology.

Further, it is possible to directly transmit information from various home appliances to a television to visualize a state of the various home appliances. Further, various sensors determine presence/absence of a resident and transmit data to an air conditioner, a light, and the like and can therefore turn on and off power supplies thereof. Furthermore, it is possible to display an advertisement on displays provided on the various home appliances via the Internet.

Hereinabove, there have been described an example of the IoT system 9000 to which the technology according to the present disclosure is applicable. The technology according to the present disclosure is suitably applicable to the IoT device 9001 in the configuration described above. Specifically, the communication apparatus 100 of FIG. 1 can be applicable to the IoT device 9001. By applying the technology according to the present disclosure to the IoT device

9001, it is possible to execute a loop-back test during wireless transmission so as to improve reliability of the IoT device 9001.

Note that the above-described embodiments are examples for embodying the present technology, and matters in the embodiments each have a corresponding relationship with disclosure-specific matters in the claims. Likewise, the matters in the embodiments of the present technology and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

Additionally, the present technology may also be configured as below.

(1) A transmission/reception circuit including:
a transmission circuit that modulates a transmission information signal and supplies the transmission information signal, as a transmission signal, to an antenna;
a loop-back test signal generation circuit that modulates a predetermined signal to be modulated and supplies the predetermined signal to be modulated as a loop-back test signal;
a selection unit that selects one of a reception signal from the antenna or the loop-back test signal, and supplies the selected signal as a signal to be demodulated;
a reception circuit that demodulates the signal to be demodulated and acquires a reception information signal; and
a test circuit that compares the reception information signal and the predetermined signal to be modulated.

(2) The transmission/reception circuit according to (1), further including
a local oscillator that generates a predetermined local signal and supplies the predetermined local signal to the transmission circuit and the loop-back test signal generation circuit,
in which the transmission circuit mixes the predetermined local signal and the transmission information signal, and
the loop-back test signal generation circuit mixes the predetermined local signal and the predetermined signal to be modulated.

(3) The transmission/reception circuit according to (2),
in which the local oscillator further transmits the predetermined local signal to the reception circuit, and
the reception circuit mixes the predetermined local signal and the signal to be demodulated.

(4) The transmission/reception circuit according to (3), further including
a phase shifter that corrects a phase error of the predetermined local signal and supplies the predetermined local signal to the reception circuit,
in which the local oscillator supplies the predetermined local signal to the reception circuit via the phase shifter.

(5) The transmission/reception circuit according to (1),
in which the transmission circuit includes
a first local oscillator that generates a first local signal, and
a first mixer that mixes the first local signal and the transmission information signal, and
the reception circuit includes
a second local oscillator that generates a second local signal, and
a second mixer that mixes the second local signal and the signal to be demodulated.

(6) The transmission/reception circuit according to (5),
in which the loop-back test signal generation circuit includes
a third local oscillator that generates a third local signal, and
a third mixer that mixes the third local signal and the predetermined signal to be modulated.

(7) The transmission/reception circuit according to (5),
in which the transmission circuit supplies the transmission signal to the antenna and supplies the transmission signal, as the predetermined signal to be modulated, to the loop-back test signal generation circuit.

(8) A communication apparatus including:
a transmission circuit that modulates a transmission information signal and supplies the transmission information signal, as a transmission signal, to an antenna;
the antenna that transmits the transmission signal and receives a reception signal;
a loop-back test signal generation circuit that modulates a predetermined signal to be modulated and supplies the predetermined signal to be modulated as a loop-back test signal;
a selection unit that selects one of the reception signal from the antenna or the loop-back test signal, and supplies the selected signal as a signal to be demodulated;
a reception circuit that demodulates the signal to be demodulated and acquires a reception information signal; and
a test circuit that compares the reception information signal and the predetermined signal to be modulated.

(9) A method of controlling a transmission/reception circuit, including:
a transmission step of modulating a transmission information signal and supplying the transmission information signal, as a transmission signal, to an antenna;
a loop-back test signal generation step of modulating a predetermined signal to be modulated and supplying the predetermined signal to be modulated as a loop-back test signal;
a selection step of selecting one of a reception signal from the antenna or the loop-back test signal, and supplying the selected signal as a signal to be demodulated;
a reception step of demodulating the signal to be demodulated and acquiring a reception information signal; and
a test step of comparing the reception information signal and the predetermined signal to be modulated.

REFERENCE SIGNS LIST

100 Communication apparatus
110 Antenna
120 Signal processing unit
200 Transmission/reception circuit
211, 212 Selector
220 Reception circuit
221, 231, 241 Mixer
222, 232, 242 Low-noise amplifier
223, 233, 243, 260 Local oscillator
230 Loop-back test signal generation circuit
240 Transmission circuit
250 Test circuit
270 Phase shifter
271 Delay circuit
272 Multiplexer
9001 IoT device

The invention claimed is:

1. A transmission/reception circuit comprising:
a transmission circuit that modulates a transmission information signal and supplies the transmission information signal, as a transmission signal, to an antenna;
a loop-back test signal generation circuit that modulates a predetermined signal to be modulated and supplies the predetermined signal to be modulated as a loop-back test signal;
a selection unit that selects one of a reception signal from the antenna or the loop-back test signal, and supplies the selected signal as a signal to be demodulated;
a reception circuit that demodulates the signal to be demodulated and acquires a reception information signal; and
a test circuit that compares the reception information signal and the predetermined signal to be modulated.

2. The transmission/reception circuit according to claim 1, further comprising
a local oscillator that generates a predetermined local signal and supplies the predetermined local signal to the transmission circuit and the loop-back test signal generation circuit,
wherein the transmission circuit mixes the predetermined local signal and the transmission information signal, and
the loop-back test signal generation circuit mixes the predetermined local signal and the predetermined signal to be modulated.

3. The transmission/reception circuit according to claim 2, wherein the local oscillator further transmits the predetermined local signal to the reception circuit, and
the reception circuit mixes the predetermined local signal and the signal to be demodulated.

4. The transmission/reception circuit according to claim 3, further comprising
a phase shifter that corrects a phase error of the predetermined local signal and supplies the predetermined local signal to the reception circuit,
wherein the local oscillator supplies the predetermined local signal to the reception circuit via the phase shifter.

5. The transmission/reception circuit according to claim 1, wherein the transmission circuit includes
a first local oscillator that generates a first local signal, and
a first mixer that mixes the first local signal and the transmission information signal, and
the reception circuit includes
a second local oscillator that generates a second local signal, and
a second mixer that mixes the second local signal and the signal to be demodulated.

6. The transmission/reception circuit according to claim 5, wherein the loop-back test signal generation circuit includes
a third local oscillator that generates a third local signal, and
a third mixer that mixes the third local signal and the predetermined signal to be modulated.

7. The transmission/reception circuit according to claim 5, wherein the transmission circuit supplies the transmission signal to the antenna and supplies the transmission signal, as the predetermined signal to be modulated, to the loop-back test signal generation circuit.

8. A communication apparatus comprising:
a transmission circuit that modulates a transmission information signal and supplies the transmission information signal, as a transmission signal, to an antenna;
the antenna that transmits the transmission signal and receives a reception signal;
a loop-back test signal generation circuit that modulates a predetermined signal to be modulated and supplies the predetermined signal to be modulated as a loop-back test signal;
a selection unit that selects one of the reception signal from the antenna or the loop-back test signal, and supplies the selected signal as a signal to be demodulated;
a reception circuit that demodulates the signal to be demodulated and acquires a reception information signal; and
a test circuit that compares the reception information signal and the predetermined signal to be modulated.

9. A method of controlling a transmission/reception circuit, comprising:
a transmission step of modulating a transmission information signal and supplying the transmission information signal, as a transmission signal, to an antenna;
a loop-back test signal generation step of modulating a predetermined signal to be modulated and supplying the predetermined signal to be modulated as a loop-back test signal;
a selection step of selecting one of a reception signal from the antenna or the loop-back test signal, and supplying the selected signal as a signal to be demodulated;
a reception step of demodulating the signal to be demodulated and acquiring a reception information signal; and
a test step of comparing the reception information signal and the predetermined signal to be modulated.

* * * * *